United States Patent
Wunsch et al.

[15] 3,658,487
[45] Apr. 25, 1972

[54] PRODUCTION OF PHOSPHONITRILIC CHLORIDES

[72] Inventors: Gerd Wunsch, Speyer; Richard Schiedermaier; Karl Wintersberger, both of Ludwigshafen, all of Germany

[73] Assignee: Badische Anilin- & Soda-Fabrik Aktiengesellschaft, Ludwigshafen (Rhine), Germany

[22] Filed: Apr. 10, 1970

[21] Appl. No.: 27,442

[30] Foreign Application Priority Data

Apr. 15, 1969 Germany......................P 19 18 947.0

[52] U.S. Cl............................................................23/357
[51] Int. Cl.....................................C01b 21/52, C01b 25/00
[58] Field of Search....................................................23/357

[56] References Cited

UNITED STATES PATENTS

| 3,359,080 | 12/1967 | Ridgway et al. | 23/357 |
| 3,384,462 | 4/1968 | Fluck | 23/357 |
| 2,872,283 | 2/1959 | Taylor | 23/357 |
| 2,862,799 | 12/1958 | Dittmar et al. | 23/357 X |
| 3,379,510 | 4/1968 | Jaszka | 23/357 |

Primary Examiner—Herbert T. Carter
Attorney—Johnston, Root, O'Keeffe, Keil, Thompson & Shurtleff

[57] ABSTRACT

Phosphonitrilic chlorides having the formula $(PNCl_2)_n$ where $n$ denotes an integer of at least 3, are obtained by reacting chlorine and ammonia simultaneously with elementary phosphorus in an inert solvent.

8 Claims, No Drawings

PRODUCTION OF PHOSPHONITRILIC CHLORIDES

It is known from Gmelin, 8th edition, 1965, volume 16c, pages 549 et seq. that phosphonitrilic chlorides are obtained by reaction of phosphorus pentachloride with ammonia or ammonium chloride in the presence or absence of an inert solvent at elevated temperature.

A mixture of phosphonitrilic chlorides having different degrees of polymerization is obtained according to the equations:

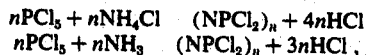

$$nPCl_5 + nNH_4Cl \rightarrow (NPCl_2)_n + 4nHCl$$
$$nPCl_5 + nNH_3 \rightarrow (NPCl_2)_n + 3nHCl,$$

$n$ being an integer of 3 or more. Cyclic or chain phosphonitrilic chlorides are formed.

Production of phosphonitrilic chlorides from phosphorus pentachloride has the disadvantage however that, starting from elementary phosphorus, two operations are necessary, namely:

1. the production of phosphorus pentachloride from the elements; and
2. the reaction of the phosphorus pentachloride with ammonia or ammonium chloride.

This is particularly disadvantageous because phosphorus pentachloride is strongly hygroscopic and therefore special precautions have to be taken to exclude moisture during its processing into phosphonitrilic chlorides.

The present invention has for an object to prepare phosphonitrilic chlorides having the formula: $(PNCl_2)_n$ (in which $n$ denotes an integer of at least 3) by a simpler method without using phosphorus pentachloride.

We have found that this object is achieved by reacting elementary phosphorus simultaneously with chloride and ammonia in the presence of an inert solvent.

The elementary phosphorus used may be white phosphorus or red phosphorus. White phosphorus is preferred, however, because it is less expensive than red phosphorus.

All solvents which are inert to chlorine, for example hydrocarbons, particularly chlorohydrocarbons, are suitable as inert solvents. Since the reaction is carried out generally at temperatures of 60° to 150° C, solvents whose boiling point lies within this range are particularly suitable. Examples are tetrachloroethane, carbon tetrachloride, chlorobenzene and chloroform.

The reaction is generally carried out by placing a solution or suspension of phosphorus in the solvent in question in a suitable container and introducing ammonia and chlorine into the same. Since the reaction is exothermic, the reaction medium is cooled, advantageously by evaporative cooling. After the reaction is over, the reaction mixture is cooled, advantageously be evaporative cooling. After the reaction is over, the reaction mixture is advantageously boiled for a short time, for example ten to sixty minutes. The reactants are generally employed in about stoichiometric proportions but it may be advantageous to use ammonia in an excess, for example of up to 10 percent above the stoichiometric amount.

After this heating, a small insoluble residue is filtered off and the solvent distilled off. The crude product may either be used as such or, in order to purify it and remove more highly polymerized phosphonitrilic halides, it may be taken up in ligroin and the soluble phosphonitrilic chlorides recovered therefrom by distilling off the solvent. These phosphonitrilic chlorides may for example be recrystallized from benzene for further purification.

Products having a higher proportion of oily and highly polymerized phosphonitrilic chlorides or products having a higher proportion of low molecular weight phosphonitrilic chlorides may be obtained by variation of the reaction conditions. To obtain oily highly polymerized products, the solutions or suspensions may have added to them small amounts of metals or salts thereof, particularly aluminum, iron, copper, cobalt, manganese, nickel or salts thereof. These additions amount as a rule to 0.1 to 5 percent by weight with reference to the total weight of the solution. For the production of oligomeric phosphonitrilic chlorides having a high proportion of particularly trimeric and tetrameric cyclic products, it is advantageous to carry out the addition of the whole of the halogen required for the reaction in a shorter time than the addition of the ammonia. Thus the halogen should be added in 60 to 80 percent of the time which is required for metering in the ammonia. It is also advantageous to pass in the first amounts of ammonia, from one-eighth to one-third of the total amount of ammonia required, slowly into the reaction mixture, for example at the rate of 1 to 10 liters of ammonia per hour per gram atom of phosphorus contained in the solution or suspension. The whole of the ammonia should be passed into the solution or suspension containing phosphorus during a period of 30 to 60 minutes per gram atom of phosphorus.

The following example illustrates the invention.

EXAMPLE 124 g of white phosphorus (4 gram atoms) is dissolved in 4,000 ml of 1,1,2,2-tetrachloroethane at 80° C. While stirring vigorously, 231 liters of chlorine and 99 liters of gaseous ammonia are passed in within 4 hours. The temperature in the solution is kept at 110° to 120° C. Whereas the amount of chlorine is distributed uniformly over the first 3 hours (77 liters per hour), ammonia is passed in during the first hour at a rate of 10 liters per hour and in the other 3 hours at a rate of 29.7 liters per hour. The reaction mixture is then boiled under reflux for 1 hour. The solution is filtered and the solvent is removed from the filtrate by distilling it off at a pressure of 12 mm. The crude product, in which more than 92 percent of the amount of phosphorus used is contained, is taken up in ligroin. After the ligroin has been distilled off, 330 parts by weight of crystalline cyclic trimeric and tetrameric phosphonitrilic chloride can be removed (equivalent to a yield of 71 percent with reference to the amount of phosphorus used), the remainder consisting of phosphonitrilic chlorides of higher molecular weight.

We claim:

1. A process for the production of phosphonitrilic chlorides having the formula $(PNCl_2)_n$ where $n$ denotes an integer of at least 3, which process comprises contacting chlorine and ammonia simultaneously with elementary phosphorus in an inert solvent, said solvent being a chlorohydrocarbon, at a temperature of from 60° to 150° C.

2. A process according to claim 1 wherein the phosphorus is dissolved in said chlorohydrocarbon solvent.

3. A process according to claim 1 wherein the phosphorus is suspended in said solvent.

4. A process according to claim 1 for the production of a high proportion of oily highly polymerized phosphonitrilic chlorides having said formula $(PNCl_2)_n$, wherein there is added to said solvent a small amount of at least one of the metals aluminum, iron, copper, cobalt, manganese, nickel or their salts.

5. A process according to claim 1 for the production of phosphonitrilic chlorides of said formula $(PNCl_2)_n$ and having a high proportion of trimeric and tetrameric phosphorus nitride chlorides, wherein the chlorine is added simultaneously with the ammonia during 60 to 80 percent of the time taken up for the introduction of ammonia.

6. A process according to claim 5, wherein one-eighth to one-third of the total amount of ammonia required is introduced at the rate of 1 to 10 liters of ammonia per hour per gram atom of phosphorus contained in the solvent.

7. A process according to claim 5 wherein the phosphorus is suspended in the solvent.

8. A process according to claim 5 wherein the solvent is tetrachloroethane, carbon tetrachloride, chlorobenzene or chloroform.

* * * * *

PO-1050
(5/69)

UNITED STATES PATENT OFFICE
CERTIFICATE OF CORRECTION

Patent No. 3,658,487    Dated April 25, 1972

Inventor(s) Gerd Wunsch et al

It is certified that error appears in the above-identified patent and that said Letters Patent are hereby corrected as shown below:

Column 1, lines 11 to 12, "
$nPCl_5 + nNH_4Cl \quad (NPCl_2)_n + 4nHCl$
$nPCl_5 + nNH_3 \quad (NPCl_2)_n + 3nHCl,$
" should read --
$nPCl_5 + nNH_4Cl \rightarrow (NPCl_2)_n + 4nHCl$
$nPCl_5 + nNH_3 \rightarrow (NPCl_2)_n + 3nHCl,$
--.

Signed and sealed this 5th day of September 1972.

(SEAL)
Attest:

EDWARD M. FLETCHER, JR.
Attesting Officer

ROBERT GOTTSCHALK
Commissioner of Patents